United States Patent [19]

Anderson et al.

[11] Patent Number: 5,639,150

[45] Date of Patent: Jun. 17, 1997

[54] ELECTRONIC COMPONENT ENCLOSURE AND METHOD

[75] Inventors: Thomas E. Anderson; Glen A. Stelzer, both of Schaumburg; Jerry L. Young, Oak Forest, all of Ill.

[73] Assignee: Amco Engineering Co., Shiller Park, Ill.

[21] Appl. No.: 532,271

[22] Filed: Sep. 22, 1995

[51] Int. Cl.$^6$ .................................................. A47B 47/03
[52] U.S. Cl. .................................. 312/265.3; 312/265.2; 312/265.4; 312/265.5; 312/265.6
[58] Field of Search .......................... 312/403, 265.1, 312/265.2, 265.3, 265.4, 265.6, 265.5; 52/657

[56] References Cited

U.S. PATENT DOCUMENTS

| | | | |
|---|---|---|---|
| 3,912,407 | 10/1975 | Heininger | 52/657 X |
| 3,914,062 | 10/1975 | Heininger | 52/657 X |
| 4,050,498 | 9/1977 | Lucchetti | 52/657 X |
| 4,592,672 | 6/1986 | Ruch, Jr. | 52/657 X |

*Primary Examiner*—Peter M. Cuomo
*Assistant Examiner*—Stephen Vu
*Attorney, Agent, or Firm*—Jack E. Dominik

[57] ABSTRACT

The development of a main channel configuration which constitutes the four corners and vertical support of an enclosure is disclosed. The channel is essentially a right angle with the vertex of the angle chamfered which provides additional strength, and a pleasing sturdy aesthetic appearance. The lateral faces of the channel terminate in recessed gutters. The channel itself is symmetrical about a plane extending perpendicular through the chamfered face which connects the two side faces. The enclosure thereafter contemplates eight gussets, four at the top corners and four at the bottom corners. The gussets join cross ties at the two sides, and the front and rear, both top and bottom. Horizontal and vertical unistruts are provided in nestingly overlapped fashion interiorly of the main channels to add additional strength and also to secure the mounting channels which are positioned at various pre-selected locations.

11 Claims, 5 Drawing Sheets

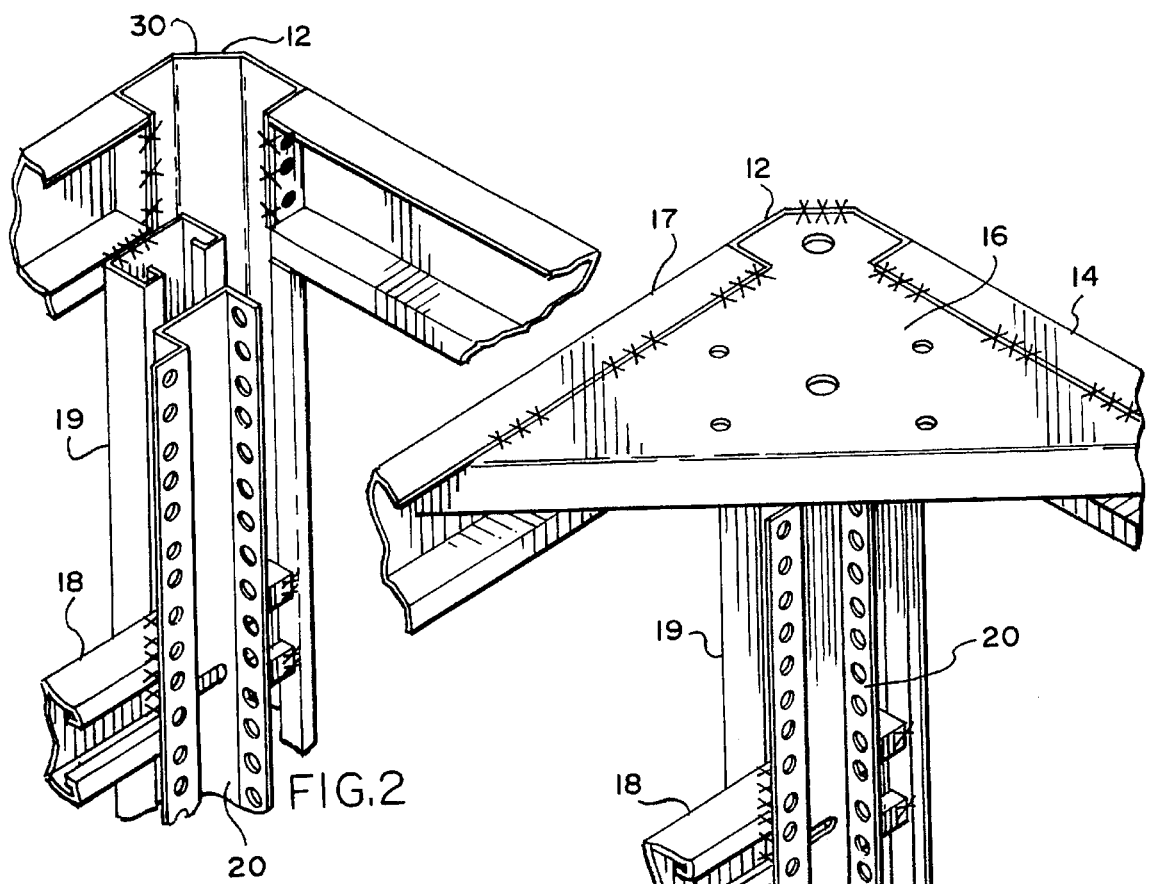
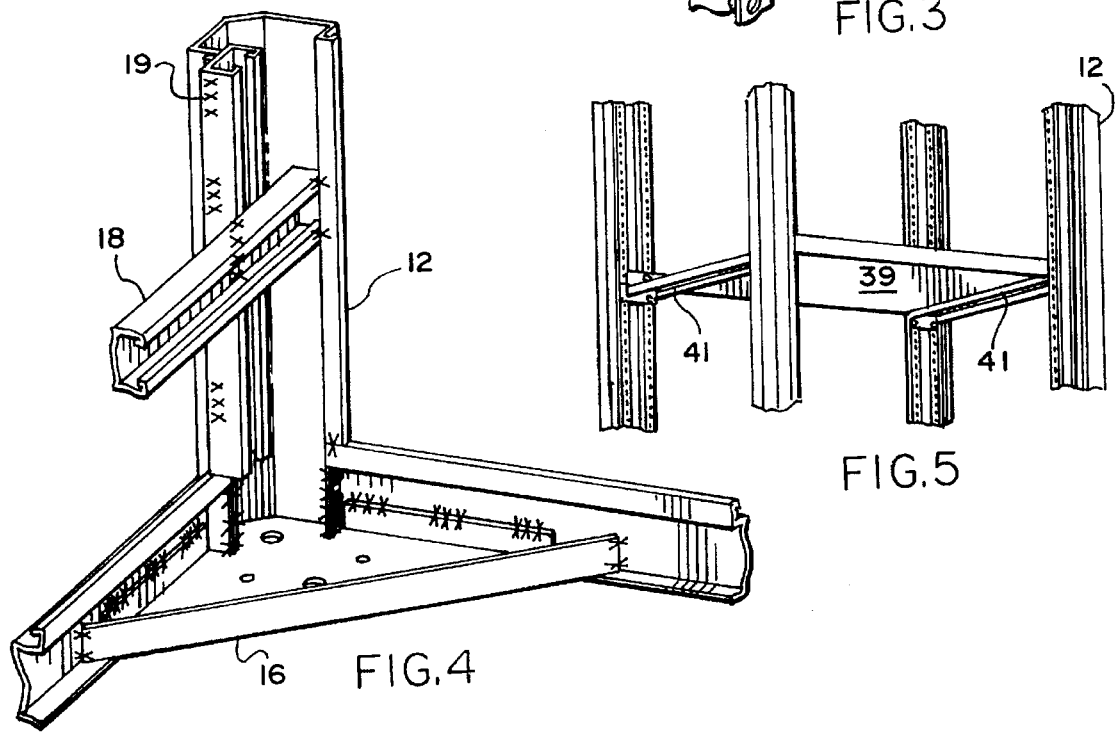

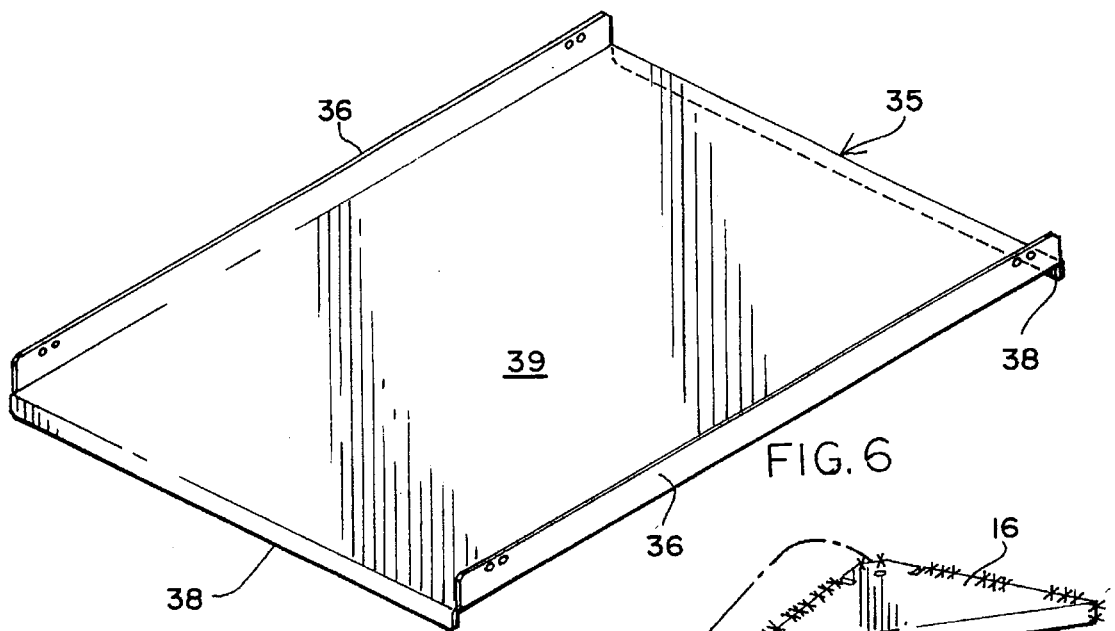
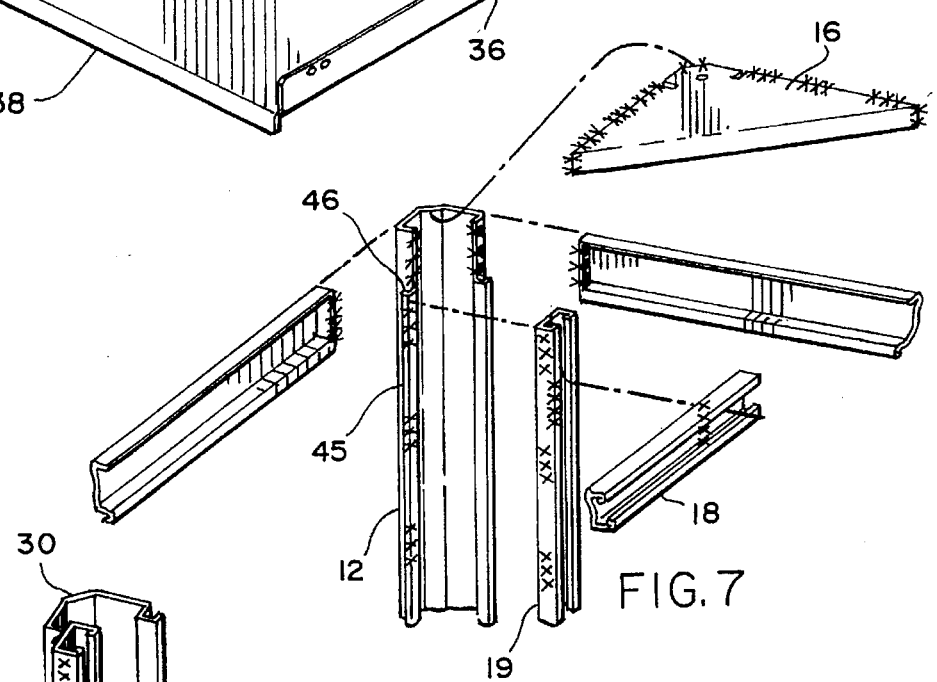
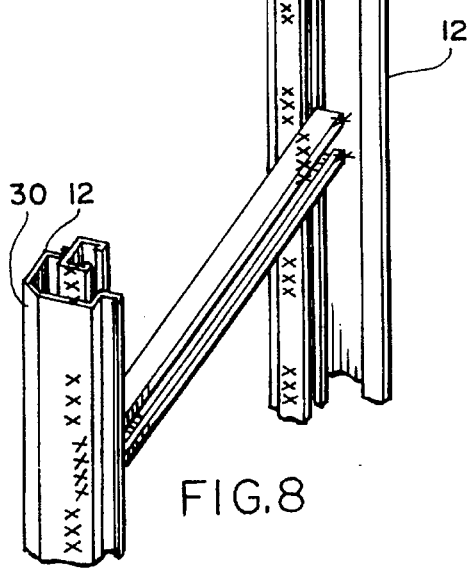
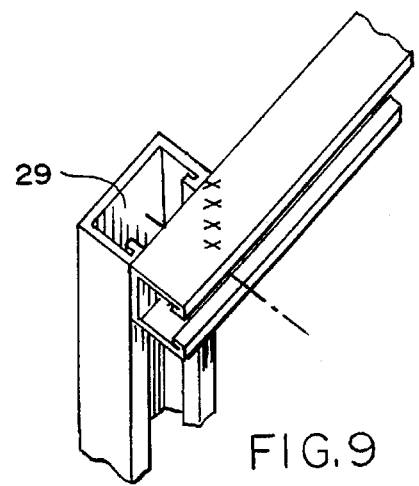
FIG. 6
FIG. 7
FIG. 8
FIG. 9

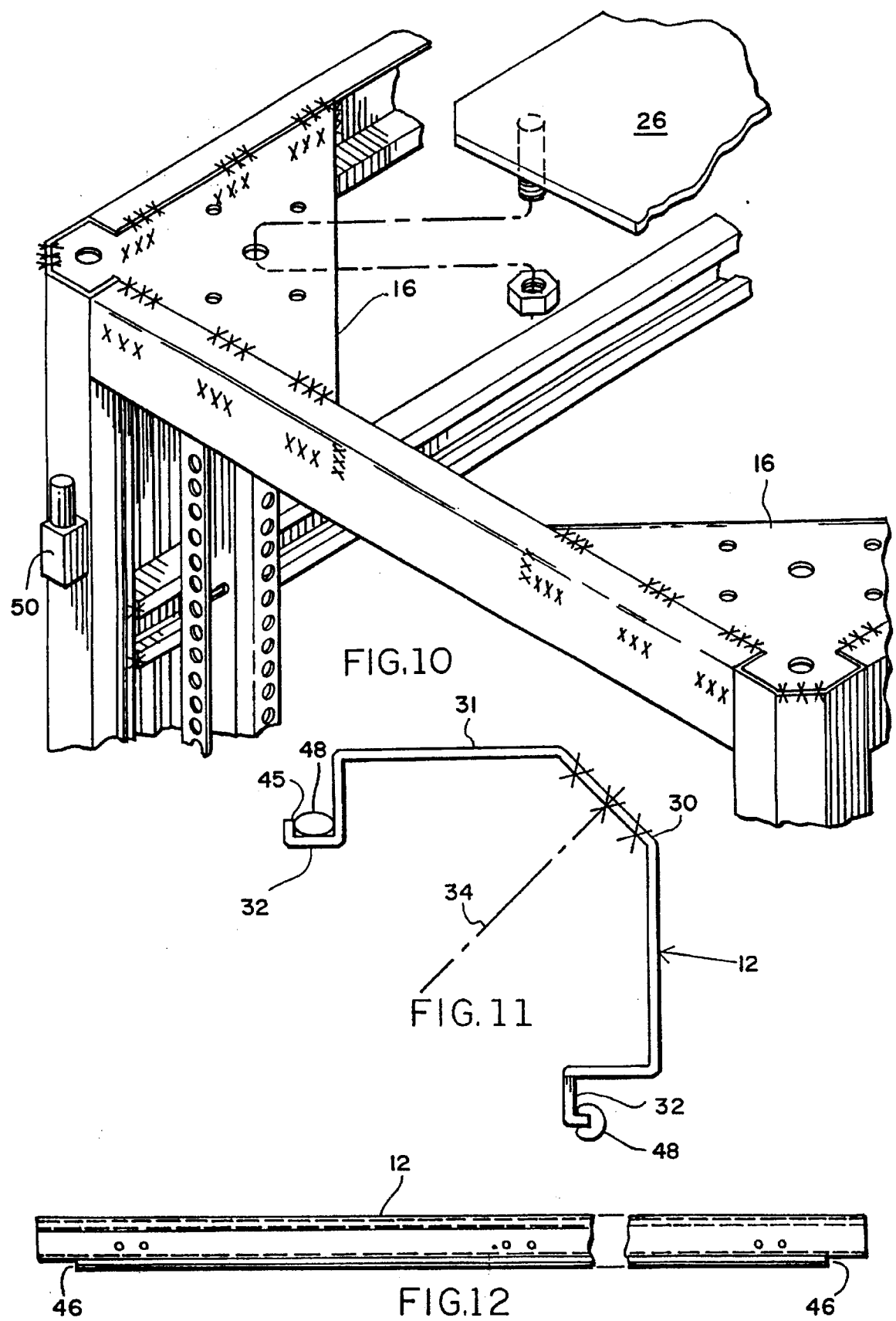

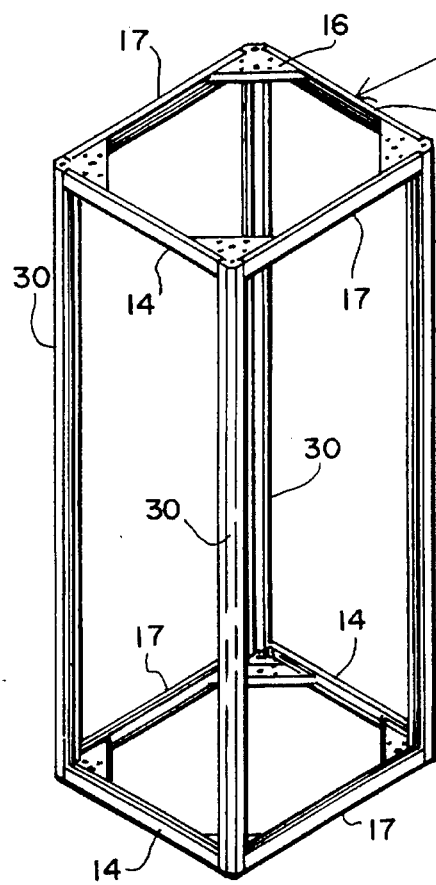
FIG.13
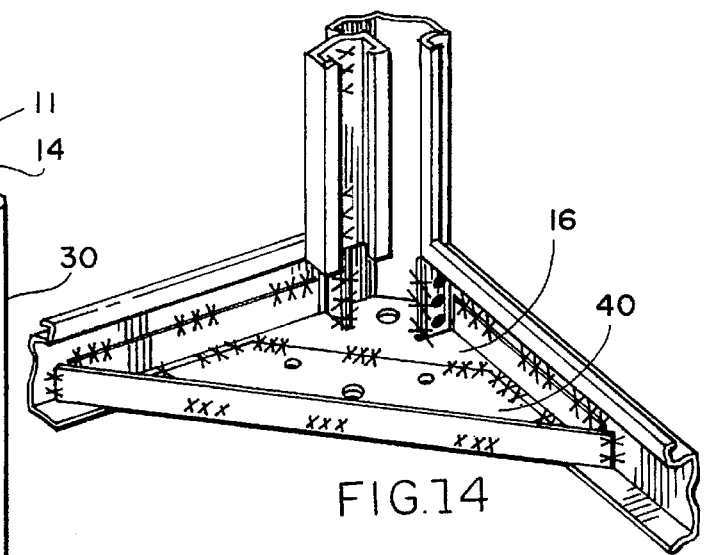
FIG.14
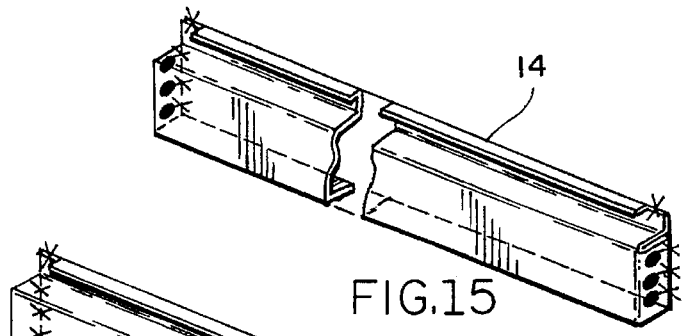
FIG.15
FIG.16
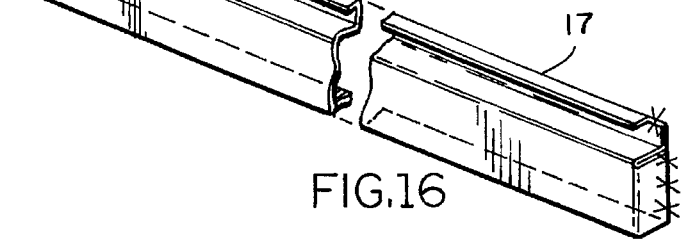
FIG.17
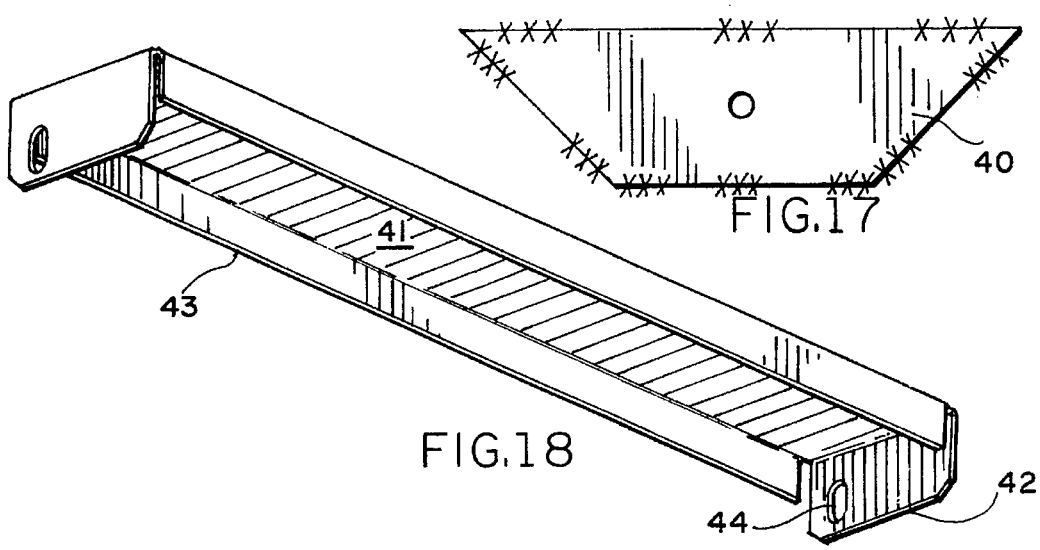
FIG.18

ELECTRONIC COMPONENT ENCLOSURE AND METHOD

BACKGROUND OF THE INVENTION

The present invention relates to a modular enclosure and method of the type employed to house computer hardware, communications gear, and other electronic components which conforms to various standards for size, strength, and access known in the industry.

SUMMARY OF THE PRIOR ART

The present invention is involved in the enclosing and housing of computer gear, communications gear, and other electronic equipment. Exemplary of the present invention are U.S. Pat. Nos. 2,991,940 and 3,034,844, both expired and both assigned to the assignee of this application.

Of the subject patents, particularly U.S. Pat. No. 2,991,940 when developed was the state of the art even at the time the patent application was filed. It did meet certain static strength requirements which were adequate at the time.

Since the development of U.S. Pat. Nos. 2,991,940, 3,034,844, and 3,087,768, however, a whole new industry of computers and communications gear have evolved. Some of these if subjected to earthquake tremors or indeed an earthquake, can be substantially damaged. In addition, they are sensitive to spurious electro-type emissions. The subject of RFI shielding was in its infancy at the time of the development of the products of the subject three state of the then art patents.

In addition, including the various practical needs for such an enclosure, there are currently four requirements based upon national and international standards. They are the following:

1. Bell Core NEBS, which is a seismic test.
2. FCC primary RFI test.
3. NEMA test—NEMA certification capabilities, leakage, dust and contaminant penetration, and the like.
4. IEC—these are certain international requirements which may or may not be included in the three foregoing requirements.

Severe earthquakes, in addition to destruction of homes, highways,, and office buildings, have resulted in the twisting and mangling of computers and related communications gear. Subsequent damage from after shocks have also been severe. Had the electronics been housed in a stronger housing, however, such damage could have been mitigated if not inhibited or eliminated in some cases. Therefore, it is highly desirable to develop a modular enclosure which, because of its modularity, renders it relatively inexpensive to manufacture. Moreover, it is highly desirable to develop such a modular enclosure which is resistant to lateral loads, torsional loads, vibratory loads, and other severe conditions which may be anticipated from an earthquake or, indeed, from nearby exploding bombs where a military installation is involved. In addition, such a modular enclosure should lend itself to RFI shielding at least for primary purposes.

SUMMARY OF THE INVENTION

The present invention evolves from the development of a main channel configuration which constitutes the four corners and vertical support of an enclosure. The channel is essentially a right angle with the vertex of the angle chamfered which provides additional strength, and a pleasing sturdy aesthetic appearance. The lateral faces of the channel terminate in recessed gutters. The channel itself is symmetrical about a plane extending perpendicular through the chamfered face which connects the two side faces. In this fashion the main channel does not know left from right, or up from down, and as a consequence one single channel can be used to develop the entire vertical skeleton of the enclosure. The enclosure thereafter contemplates eight gussets,, four at the top corners and four at the bottom corners. The gussets join cross ties at the two sides, and the front and rear, both top and bottom. Horizontal and vertical unistruts are provided in nestingly overlapped fashion interiorly of the main channels to add additional strength and also to secure the mounting channels which are positioned at various pre-selected locations. The mounting means are for preselected equipment up and down along the mounting channel and its adjacent main channel. Desirably a reinforced shelf is employed as part of the mounting means. The cross ties are characterized by a comparable gutter to the gutter in all of the main channels which permits the uniform insertion of RFI and environmental insulating materials. Such material can also be employed to seal the interior from the passage of contaminants. Provision is made for butt joints of all of the cross ties with the main channels to the end that they can be seam welded to inhibit RFI leakage and otherwise seal the enclosure. Optionally, a top is provided for the enclosure which, in turn, is secured to the upper cross ties, gusset, and main channel. Side panels with flush lateral edges overlie gutters in the main channel and similarly the gutter edges in the top cross tie and bottom tie thereby adding RFI shielding and promoting a monocoque effect. Access is provided to the front and rear of the enclosure by means of removable panels, or hinged doors, or a combination of the same. Optionally, a transparent panel can be applied to the front or rear and the equipment which is inserted through slides and otherwise removably secured so that operating personnel may observe the interior portion of the enclosure whenever desired. An important aspect of one version of the present invention relates to a relatively "boltless" construction. As many joints as physically possible are seam or spot welded and the only bolts employed are to adjust the shelf upwardly and downwardly. As a result the structural integrity for purposes of seismic testing can readily be achieved. Alternatively, where the seismic testing or resistance is not required, the expense of the welding can be avoided and still have a cabinet with numerous advantages as to strength, structural integrity, and manufacturing economies.

In view of the foregoing it is a principal object of the present invention to provide an enclosure which is predicated upon a main channel which is common to all of the four corners throughout the entire vertical height of the enclosure.

A related object of the present invention is to provide a main channel and related cross ties, and gussets, to form an enclosure which, because of the gutter arrangements, is readily adaptable to RFI and environmental shielding when panels are employed which have perpendicular lateral edges with the thus-oriented gutters of the main channel and cross ties.

Yet another object of the present invention is to provide an enclosure with the main channel as described which, because of its monocoque construction as well as interior framing and the main channel will withstand significant cantilever lateral loads, which are applied from side-to-side with the back and front panel removed, the condition most vulnerable to deflection.

Yet another object of the present invention is to provide an enclosure with the basic main channel which, because of its inherent strength, monocoque construction, and integral relationship between the skeleton and the skin or frame and panels will seal the same to shield both ingress and egress undesired signals and environmental undesirables such as gases, oils, fumes, acid-laden air, and other contaminants.

Still another important object of the present invention is to achieve the foregoing objects in an environment where modular changes can be made in the depth and height of the ultimate enclosure without significant additional tooling or fixturing and predicated upon the modular aspects of the main channel, gussets cross ties and unistruts.

Finally, a most important object of the present invention is to achieve all of the foregoing advantages in a structure which is cost-effective when due consideration is given to the numerous advantages which it achieves over the prior art.

BRIEF DESCRIPTION OF THE ILLUSTRATIVE DRAWINGS

Further objects and advantages of the present invention will become apparent as the following description of an illustrative embodiment proceeds, taken in conjunction with the accompanying drawings, in which:

FIG 2 is a cut away view of a top corner showing the main channel, cross ties, and unistruts in their exploded relationship (hereinafter note that all subsequent Figures including this one show welds in seamless forms with a string of "x's", and where spot welding is used, a dark circle is employed. This is applicable to FIGS. 2–18);

FIG. 3 is a perspective view of a top corner showing corner gusset;

FIG. 4 is a view comparable to that of FIG. 3 but in perspective showing the bottom corner gusset and cross ties and unistruts;

FIG. 5 is a perspective view showing a shelf mounted interiorly of the frame;

FIG. 6 is a perspective view of the shelf as shown in FIG. 5;

FIG. 7 is yet another exploded perspective view of a typical top corner and welded aspects of the joint;

FIG. 8 is yet another perspective view of the overlapped unistrut horizontal and vertical members resting in the main channels;

FIG. 9 is a view sequential to that of FIG. 8 but showing in specific detail how the vertical unistrut is secured to the horizontal unistrut;

FIG. 10 is yet another perspective view of the two top front gusset/showing the provision for the removable hinge mounting of the front door;

FIG. 11 is a cross-sectional view of the main channel indicating its various components with a center line shown with respect to which both sides of the main channel are symmetrical;

FIG. 12 is a front elevation of the main channel pre-drilled for the hinge assembly shown broken for purposes of illustration;

FIG. 13 is a perspective view of the basic frame illustrating its modular use of four main channels, eight corner brackets, two top cross ties, two lower cross ties, and four side cross ties;

FIG. 14 is a perspective view of a typical lower corner;

FIG. 15 is a broken perspective view of a front cross tie;

FIG. 16 is a broken perspective view of a side cross tie;

FIG. 17 is a perspective view of a bottom corner gusset bracket doubler employed for seismic reinforcement; and FIG. 18 is a perspective view of a reinforcing shelf bracket.

DESCRIPTION OF A PREFERRED EMBODIMENT

Figure 1:
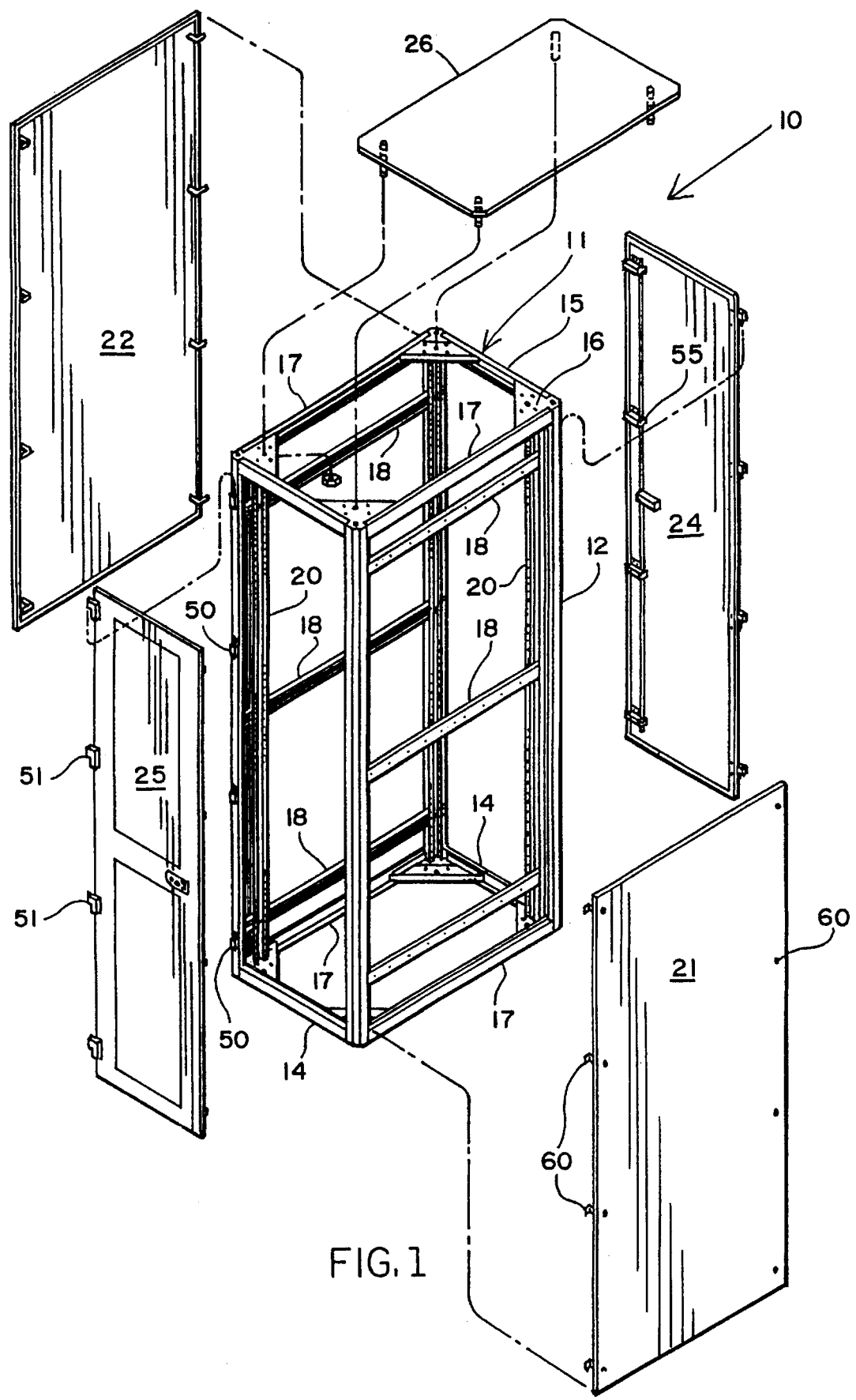
FIG. 1 is an exploded perspective view of an illustrative enclosure showing the frame in the central portion, the two side panels to the left and right, and the front and rear panels their removed relationship to the frame.

The preferred embodiment of the subject modular enclosure 10 is illustrated in FIG. 1. There it will be seen that the modular enclosure 10 is predicated upon a main channel 12 which forms all four of the vertical corners. The main channels 12, turn, are secured by means of front and rear cross ties 14, 15. Gussets 16 and gusset double 40 join the cross ties 14, 17 and 15.17 at both the top and bottom. Unistruts 18 which are both horizontal 18 and vertical 19 are applied interiorly of the enclosure 10, and mounting channels 20 are provided to modularly and in spaced relationship on a preselected spacing receive, and support, the enclosure and enclosed materials. Desirably shelves 39 fit within the enclosure 10 and are secured horizontally to the mounting channels 20, both front and rear. The entire cabinet is housed by panels for both the lateral sides 21 and 22. Those panels, are complimented by a rear panel 24 or door, and a front panel or door 25. A top 26 as shown in exploded view of FIG. 1 is secured to the upper portion of the frame 11 when one is desired. The main channel 12 has a chamfered face 30, lateral faces 31, terminating in reversely formed gutters 32. A symmetrical relationship provided between the lateral faces and gutters along an imaginary plane 34 drawn perpendicular to the chamfered face of the main channel 12, All of the ties desirably have matching gutters to the gutters 32 of the main channel 12 to provide a uniform frame 11 for the side panels 21, 22 and rear and front doors 25, 26 or panels. RFI shielding 48 is secured to the gutter 32 or gutter lip 45 as shown in FIG. 11.

Turning now to FIG. 2, the nesting relationship between the horizontal unistrut 18 is welded to the vertical unistrut 19 as best shown in FIG. 9 as well as FIGS. 2, 3, and 4 by the "x's" which appear. When assembled, as shown in FIG. 4, the vertical unistrut 19 is welded to the base of one of the gutters 32 of the main channel 12. Desirably it is welded at a median portion to distribute the strength contributed by the vertical unistrut 19 in combination with the main channel 12. The horizontal unistrut 18 is welded to the vertical unistrut 19 as best shown in FIG. 9. This relationship is common to all of the horizontal unistruts 18 and their securement to the vertical unistrut 19. Thereafter, the mounting channels 20, as shown in FIG. 3, are further secured by means of welding adjacent all of the interlocking elements. The gussets 16 are all welded to the external flange of the ties, whether they be front cross ties 14, rear cross ties 15, or side cross ties 17. This relationship is also illustrated in FIG. 7 where further weldments are shown by means of strings of "x's" for a seam joining the vertical unistrut channel 19 in secured relationship to horizontal unistrut channel 18.

To support the various components interiorly, and also to impart additional lateral strength to the enclosure 10, desirably a shelf 39 is provided. The shelf 39 has front to rear upstanding lateral flanges 36 for mounting, and depending flanges 38 for reinforcement. The flanges depend from the pan portion 39 of the shelf 35.

Turning now to FIG. 18, it will be seen that the shelf 35 is reinforced by means of shelf bracket 41 which includes end mounts 42 with their respective mounting slots 44. Bracket flanges 43 depend from the edges of the shelf bracket 41 to provide additional support, particularly as the front and rear portions thereof engage the reinforcing flange 38 of the shelf 35. The lateral holes in the shelf 35 as well as the longitudinal slot 44 in the reinforcing bracket 41 are utilized to secure the combination of shelf 35 and reinforcing bracket 41 to the mounting channels 20.

FIG. 12 shows the main channel 12 with its opposed gutter lip notches 46. The gutter lip notches 46, particularly as shown in FIG. 7, permits butt welding the ends of the ties into the notches so that a full weld, whether seam or spot, can secure the tie ends to the flat face of the gutter notch 46. These are mounted in flush relationship to the end that the gusset 16 as shown in FIG. 10 is beneath the lateral flanges of the ties at all eight corners, both top and bottom.

As shown in FIG. 1, hinge post 50 are provided at the front portion of the enclosure 10 to receive the hinges 51 of the front door 25. Mounting door latch brackets 55 in a single operating assembly are secured to the rear panel 24 or door 25. Finally, the side panels 21, 22 employ securement means 60 which are spaced in order to engage interior members in the enclosure rather than penetrate the gutter 32 of the main channel 12.

The preferred method of assembly of all elements is to assemble the main channels 12 to the front cross ties 15 thereby creating a pair of half frames for receiving the front or rear doors 25. Thereafter, the half frames are assembled to the opposing half frames by securing the side cross ties to the opposed main channels and nestingly receiving the gussets 16.

This basically completes the frame 11 as illustrated in FIG. 13. Once the frame as illustrated in FIG. 13 has been completed, the vertical unistruts are desirably welded in place at a mid-position along the base of the interior gutter of the opposed main channels 12. Thereafter, the horizontal unistruts 18 are welded in place. Finally, the frame 11 as illustrated in FIG. 1 is completed by securing the mounting channels 20 to the horizontal unistruts 18.

At this point, the shelves 35 are installed at pre-selected locations, but oftentimes this is not done by the manufacturer of the enclosure but rather by the customer prior to completing the entire assembly including its electronic components. The manufacturer/customer will also then apply the side panels 21, 22 by means of their fasteners 60 to the sides of the enclosure 10, concluding the structure by applying the rear panel 24 and the front door 25 in place.

In summary it will be seen that a new cabinet is disclosed with modular elements significantly reducing inventory and manufacturing costs. Moreover, in the "boltless" construction, where welding is employed to the maximum at all places which can be reached for external welding, a cabinet with superior seismic properties results. While there is an additional cost factor in the welding where it is essential to pass Belcore seismic tests and the like, the same can be achieved. In a computer or other data processing equipment enclosure where the sensitive electronic elements are very costly, the modest increase in cost attributable to the welding is more than offset by the structural integrity which it affords It will be understood that various changes in the details, materials and arrangements of parts which have been herein described and illustrated in order to explain the nature of the invention, may be made by those skilled in the art within the principle and scope of the invention as expressed in the appended claims.

What is claimed is:

1. An electronic component enclosure having a frame comprising, in combination, a main channel corner member which is formed to have two faces, the faces being joined by a chamfer, the faces being essentially perpendicular to each other, enclosure panels for the front, rear, and two opposed sides of said enclosure, said main channel being further characterized by reversely folded lateral edges which provide reversely formed J-shaped lateral gutters intended to receive the closure panels, said panels being joined by top cross ties and bottom cross ties each of which has a reversely folded lateral edge further complimentary to that of the main channel, each of said cross ties having a butt face for engaging the lateral edges of the main channel, and interior gussets for securing eight corners of the frame at both top and bottom which are formed with flanges for matingly engaging the respective cross ties, both top arid bottom.

2. In the modular enclosure of claim 1, means defining weldments which secure each element of the main channel corner member, top cross ties and bottom cross ties, and gussets to each other.

3. In the electronic component enclosure of claim 1 above, in which:

side panels are provided which have lateral and top and bottom edges to be received by the gutters of the main channel and the reversely folded gutters of the cross ties, said gutters each having a lip, whereby by inserting sealing materials between the gutters and the lateral edges of the panel shielding can be enhanced.

4. In the electronic component enclosure of claim 3 above, in which:

a sealing material, acceptable as RFI leak inhibiting is inserted in the main channel gutters, whereby RFI shielding can be introduced to the completed enclosure structure throughout the four edges of the panels, and by further securing the butt edges of the cross ties to the main channels, and pre-selectively shielding the rear and front panels when secured with preselected RFI sealing materials.

5. An electronic component enclosure comprising, in combination, four vertical main channels having identical cross-sections, each main channel having two faces disposed perpendicular to each other with J-shaped gutters at remote edges of each face, said main channel being symmetrical about a plane bisecting the convergence of the two channel faces, eight interior corner gussets having identical configurations, four side-to-side top and bottom cross ties of identical configurations, four front to rear top and bottom cross ties of identical cross-sections, two identical side panels, the entire assembly comprising the four main channels in four corners of the enclosure secured to four interior gussets at the bottom and four gussets at the top, said front to rear cross ties at the top and bottom spacing the front main channels from the rear main channels, said side-to-side upper and lower cross ties spacing the lateral sides, said interior gussets reinforcing the eight corners of the enclosure, and said side panels nestingly secured to the main channel.

6. A electronic component enclosure of claim 5 above, wherein, all of said vertical main channels, corner gussets, cross ties, being welded to each other in a permanent joint where said members mate with each other.

7. In the enclosure of claim 5 above, said gutters having a lateral lip extending in reversely folded form from the edges of the two faces of the main channel.

8. In the enclosure of claim 5 above, the side faces of the main channel terminating in a chamfer joining the same across the corner portion thereby forming the corner portion of the main channel.

9. A modular enclosure comprising, in combination, four vertical main channels having identical cross-sections, each main channel having two faces disposed perpendicular to each other with reversely folded channel for gutters having an outer lip defining a J-shaped cross-section at remote edges of each face, said main channel being symmetrical about a plane bisecting the convergence of the two channel faces, eight interior corner gussets having identical configurations, four side-to-side top and bottom cross ties of identical configurations, four front to rear top and bottom cross ties of identical cross-sections, two identical side panels, the entire assembly comprising the four main channels in four corners of the enclosure secured to four gussets at the bottom and four gussets at the top, said front to rear cross ties at the top and bottom spacing the front main channels from the rear main channels, said side-to-side upper and lower cross ties spacing the lateral sides, said gussets reinforcing the eight corners of the enclosure, and said side panels nestingly secured to the main channel.

10. A modular enclosure comprising, in combination, a main channel corner member which is formed to have two faces, the faces being joined by a chamfer, the faces being essentially perpendicular to each other, enclosure panels for the front, rear, and two opposed sides of said enclosure, said main channel being further characterized by reversely folded J-shaped lateral edges which form lateral channel-shaped gutters intended to receive the closure panels, said panels being joined by top cross ties and bottom cross ties each of which has a reversely folded lateral edge complimentary to that of the main channel, and unistrut members, two of which are positioned vertically and interiorly of the main channel, and at least two of which are positioned horizontally and nestingly to the vertical unistrut channels, said unistrut channels having depth to fit nestingly in flush interiorly of the main channel when overlapping joints are formed between the horizontal unistruct channels and their supporting vertical interior unistrut channel.

11. An electronic component enclosure comprising, in combination, four vertical main channels having identical cross-sections, each main channel having two faces disposed perpendicular to each other with reversely formed J-shaped gutters at remote edges of each face, said main channel being symmetrical about a plane bisecting the convergence of the two channel faces, eight interior corner gussets having identical configurations, four side-to-side top and bottom cross ties of identical configurations, four front to rear top and bottom cross ties of identical cross-sections, two identical side panels, the entire assembly comprising the four main channels in four corners of the enclosure secured to four gussets at the bottom and four gussets at the top, said front to rear cross ties at the top and bottom spacing the front main channels from the rear main channels, said side-to-side upper and lower cross ties spacing the lateral sides, said gussets reinforcing the eight corners of the enclosure, and said side panels nestingly secured to the main channel.

* * * * *